US008849870B2

(12) United States Patent
Sathish

(10) Patent No.: US 8,849,870 B2
(45) Date of Patent: Sep. 30, 2014

(54) METHOD, APPARATUS AND COMPUTER PROGRAM PRODUCT FOR PROVIDING CONTEXT TRIGGERED DISTRIBUTION OF CONTEXT MODELS

(75) Inventor: Sailesh Sathish, Tampere (FI)

(73) Assignee: Nokia Corporation, Espoo (FI)

( * ) Notice: Subject to any disclaimer, the term of this patent is extended or adjusted under 35 U.S.C. 154(b) by 901 days.

(21) Appl. No.: 12/146,787

(22) Filed: Jun. 26, 2008

(65) Prior Publication Data

US 2009/0327327 A1 Dec. 31, 2009

(51) Int. Cl.
*G06F 17/30* (2006.01)
*H04L 29/06* (2006.01)
*H04L 29/08* (2006.01)
*H04W 4/18* (2009.01)
*H04W 4/02* (2009.01)

(52) U.S. Cl.
CPC .............. *H04L 67/16* (2013.01); *H04L 63/20* (2013.01); *H04L 67/303* (2013.01); *H04L 63/102* (2013.01); *H04L 67/306* (2013.01); *H04W 4/18* (2013.01); *H04W 4/02* (2013.01); *H04L 67/18* (2013.01)
USPC ......................................................... 707/803

(58) Field of Classification Search
USPC ......................................................... 707/803
See application file for complete search history.

(56) References Cited

U.S. PATENT DOCUMENTS

| | | | |
|---|---|---|---|
| 6,748,195 B1 * | 6/2004 | Phillips ........................ | 455/41.2 |
| 2004/0002948 A1 * | 1/2004 | Mantyjarvi et al. ............... | 707/1 |
| 2006/0059003 A1 * | 3/2006 | Requena et al. ................... | 705/1 |
| 2006/0288402 A1 * | 12/2006 | Sathish ............................ | 726/2 |
| 2008/0016182 A1 * | 1/2008 | Sathish et al. ................. | 709/219 |
| 2008/0133586 A1 * | 6/2008 | Sathish et al. ............ | 707/103 R |

OTHER PUBLICATIONS

Article entitled "Delivery Context Overview for Device Independence" by Gimson et al. dated Mar. 20, 2006.*
*Delivery Context: Client Interfaces(DCCI) 1.0*, available at http://www.w3.org/TR/DPF/, (May 29, 2008), 39 pages.
Sathish, S., *Using declarative models for multi-device smart environments*, available at http://www.w3.org/2007/02/dmdwa-ws/Papers/sailesh-satish.pdf, (May 29, 2008), 4 pages.
Xynogalas, S. A. et al., *Context Management for the Provision of Adaptive Services to Roaming Users*, IEEE Personal Communications, IEEE Communications Society, Apr. 2004, pp. 40-47.
Written Opinion and International Search Report for PCT/FI2009/050409 dated Sep. 14, 2009.

(Continued)

*Primary Examiner* — Mahesh Dwivedi
(74) *Attorney, Agent, or Firm* — Alston & Bird LLP

(57) ABSTRACT

A method for providing context triggered distribution of context models may include receiving current context information related to a first device, accessing a context profile and a security profile associated with the first device, and developing a composite context tree based on at least a portion of the current context information related to the first device and context information related to at least one other device based at least in part on the context profile defining, for a current context of the first device, aspects of the current context information to be utilized for the developing of the composite context tree. An apparatus and computer program product corresponding to the method are also provided.

19 Claims, 7 Drawing Sheets

(56) References Cited

OTHER PUBLICATIONS

Arrufat, M. et al., *POPEYE: A Simple and Reliable Collaborative Working Environment Over Mobile Ad-Hoc Networks*, Int'l Conference on Collaborative Computing: Networking Applications and Worksharing, 2007, Collaboratecom 2007, 20071112, IEEE, Nov. 2007, pp. 399-407.

Panagiotakis, S. et al., *Context Sensitive User Profiling for Customised Service Provision in Mobile Environments*, 2005 IEEE 16th International Symposium on Personal, Indoor and Mobile Radio Communications, Sep. 2005, pp. 2014-2018.

Brodt, A. et al., *Together We Are Strong—Towards Ad-Hoc Smart Spaces*, Pervasive Computing and Communications, 2009. PerCom 2009, IEEE 2009, Mar. 2009, pp. 1-4.

Mantyjarvi, J. et al., *Collaborative Context Recognition for Handheld Devices*, Proceedings on the First IEEE International Conference on Pervasive Computing and Communications (PerCom'03), 2003, Computer Society, Mar. 2003, 8 pages.

Office Action for Korean Application No. 2011-7002046 dated May 24, 2012.

Office Action for Chinese Application No. 200980124149.8 dated Feb. 5, 2013.

Chinese Office Action for Application No. 200980124149.8, dated Sep. 16, 2013.

\* cited by examiner

METHOD, APPARATUS AND COMPUTER PROGRAM PRODUCT FOR PROVIDING CONTEXT TRIGGERED DISTRIBUTION OF CONTEXT MODELS

TECHNOLOGICAL FIELD

Embodiments of the present invention relate generally to network communication technology and, more particularly, relate to a method, apparatus and computer program product for providing distribution of context information within a network.

BACKGROUND

The modern communications era has brought about a tremendous expansion of wireline and wireless networks. Computer networks, television networks, and telephony networks are experiencing an unprecedented technological expansion, fueled by consumer demand. Wireless and mobile networking technologies have addressed related consumer demands, while providing more flexibility and immediacy of information transfer.

Current and future networking technologies continue to facilitate ease of information transfer and convenience to users. One area in which there is a demand to increase the ease of information transfer and convenience to users relates to provision of information sharing in various networks. Although there are numerous types of networks that may be utilized for sharing information, it is becoming more popular recently to share information via decentralized networks. A decentralized network may generally be considered a network that operates in a distributed environment rather than a centralized control environment. Thus, network resources such as processors, memory, switching devices, etc., may be distributed throughout the network instead of being centralized at one location (e.g., a server or server bank). As such, for example, various devices may come and go from the network at random times. A peer-to-peer (P2P) network is one example of a decentralized network. P2P networks rely primarily on the computing power and bandwidth of the devices or nodes (i.e., peers) within the network. Accordingly, P2P networks generally do not concentrate computing power and bandwidth within servers.

Each device is typically able to host a representation of, for example, its own capabilities as a hierarchical structure (e.g., as an inverted tree structure rooted at a single node). In a typical decentralized network, a user associated with a device entering the network may wish to make a service supported by the device available via the network. Alternatively, the user may wish to discover services that are available via the network. An environment in which devices are easily able to enter and leave the network with little configuration is sometimes known as a "smart space". In a smart space, users may enter into an environment and join the network to share or use resources without significant configuration set up overhead that requires extensive user involvement. As such, for example, in a multi-device scenario in which two or more devices are brought into communication with each other, certain information related to device capabilities and/or applications running on each respective device (e.g., the hierarchical structure representing the capabilities of each respective device) may be merged into a logical composite tree that may be shared amongst the devices. The information shared may include security policy or profile, capabilities, or the like. However, such a composite tree typically does not take into account changes in context or state of each of the devices.

Given the ubiquitous nature of mobile terminals, such as mobile phones and numerous other mobile electronic devices, network communications (including communication in both centralized and decentralized networks) are becoming more common. As such, smart spaces and other similar environments are becoming desirable for enhancing user experiences.

BRIEF SUMMARY OF SOME EXAMPLES OF THE INVENTION

A method, apparatus and computer program product are therefore provided to enable providing context-triggered distribution of context models. In this regard, for example, exemplary embodiments of the invention may provide for context information associated with the context of devices in communication with each other to be used for the generation of a composite context tree that may account for changes in context data related to devices associated with the composite context tree.

In an exemplary embodiment, a method of providing context triggered distribution of context models is provided. The method may include receiving current context information related to a first device, accessing a context profile and a security profile associated with the first device, and developing a composite context tree based on at least a portion of the current context information related to the first device and context information related to at least one other device based at least in part on the context profile defining, for a current context of the first device, aspects of the current context information to be utilized for the developing of the composite context tree.

In another exemplary embodiment, a computer program product for providing context triggered distribution of context models is provided. The computer program product includes at least one computer-readable storage medium having computer-executable program code portions stored therein. The computer-executable program code portions may include first, second and third program code portions. The first program code portion is for receiving current context information related to a first device. The second program code portion is for accessing a context profile and a security profile associated with the first device. The third program code portion is for developing a composite context tree based on at least a portion of the current context information related to the first device and context information related to at least one other device based at least in part on the context profile defining, for a current context of the first device, aspects of the current context information to be utilized for the developing of the composite context tree.

In another exemplary embodiment, an apparatus for providing context triggered distribution of context models is provided. The apparatus may include a processor. The processor may be configured to receive current context information related to a first device, access a context profile and a security profile associated with the first device, and develop a composite context tree based on at least a portion of the current context information related to the first device and context information related to at least one other device based at least in part on the context profile defining, for a current context of the first device.

In yet another exemplary embodiment, an apparatus for providing context triggered distribution of context models is provided. The apparatus may include means for receiving current context information related to a first device, means for accessing a context profile and a security profile associated with the first device, and means for developing a composite context tree based on at least a portion of the current context information related to the first device and context information related to at least one other device based at least in part on the context profile defining, for a current context of the first device.

Embodiments of the invention may provide a method, apparatus and computer program product for employment, for example, in mobile environments. As a result, for example, mobile terminal users may enjoy an improved capability for participation in or communication within smart spaces or other networks.

BRIEF DESCRIPTION OF THE SEVERAL VIEWS OF THE DRAWING(S)

Having thus described some embodiments of the invention in general terms, reference will now be made to the accompanying drawings, which are not necessarily drawn to scale, and wherein:

DETAILED DESCRIPTION OF SOME EMBODIMENTS OF THE INVENTION

Figure 1:
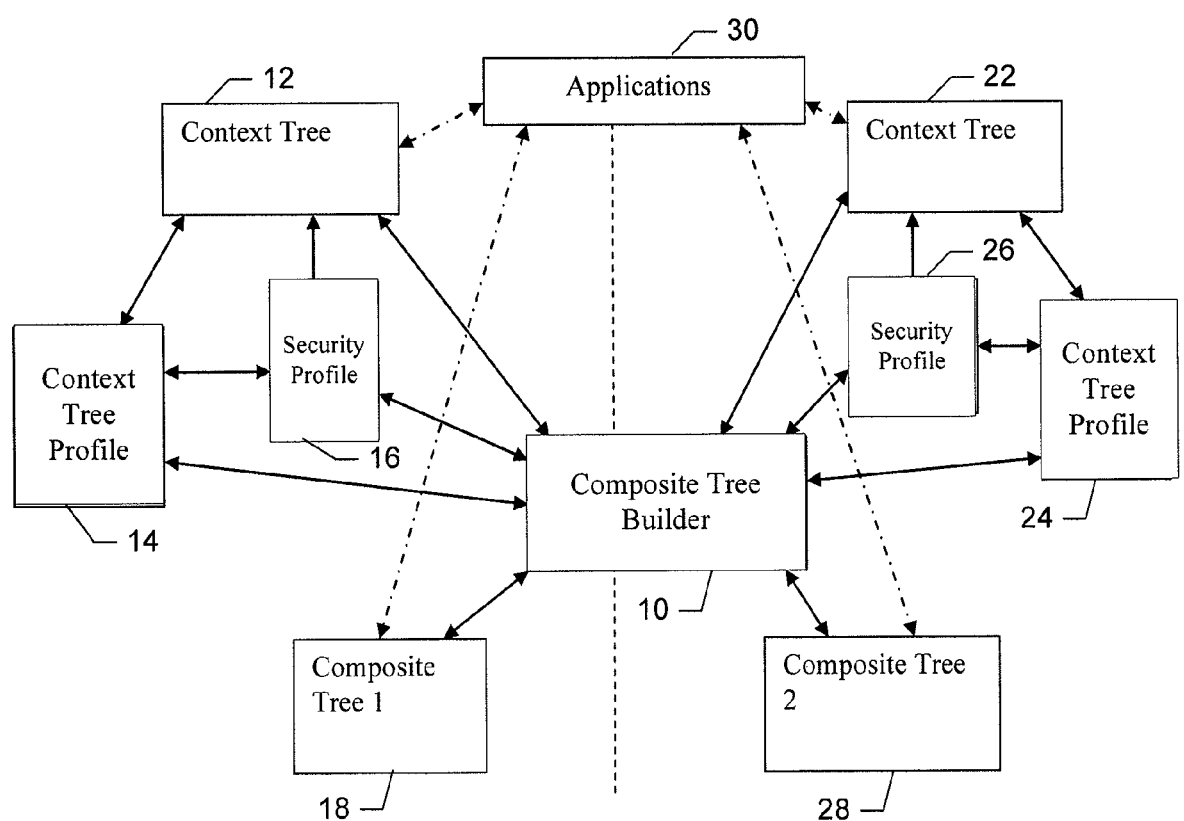
FIG. 1 illustrates a schematic block diagram of a system for enabling context-triggered distribution of context models according to an exemplary embodiment of the present invention.

Some embodiments of the present invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information" and similar terms may be used interchangeably to refer to data capable of being transmitted, received and/or stored in accordance with embodiments of the present invention. Moreover, the term "exemplary", as used herein, is not provided to convey any qualitative assessment, but instead merely to convey an illustration of an example. Thus, use of any such terms should not be taken to limit the spirit and scope of embodiments of the present invention.

Embodiments of the present invention may provide a mechanism by which context information associated with a particular user or the particular user's device may be utilized for composite context tree generation. The composite context tree may then be shared among network devices including, for example, the devices providing context information used to generate the composite context tree. However, embodiments of the present invention may further provide that the composite context tree may be determined based on policies that affect the state of the devices at any given time. Thus, for example, in addition to a security profile and/or privacy profile set by the user or other entities, the current context data associated with a device or devices in the network may be considered for dynamic building and updating of the composite context tree.

Electronic devices have been rapidly developing in relation to their communication capabilities. As the capabilities of such devices have increased, applications that are sensitive to the capabilities of the devices have also been developed. Thus, for example, applications that are sensitive to the current operating state or context of devices have been developed. The devices are often able to determine, keep and communicate information about their own current operating state. For example, battery level, available bandwidth, certain device settings, hardware and software capabilities, local ambient light level and many other state related pieces of information may be determined and/or communicated to other devices. In order to communicate information on device operating state to various applications such as, for example, an application associated with accessing the web, an interface may be provided. An example of such an interface is a Delivery Context: Client Interface (DCCI). DCCI may enable context information, which may be referred to as delivery context information, to be made available to scripts running in web pages within a browser on a device.

Context is generally defined as any information that can be used to characterize the situation of an entity. Context parameters may include parameters related to, for example, environmental context, social context, spatio-temporal context, task context, personal context, terminal context, service context, access context, and/or the like. Of these exemplary contexts, environmental context may describe the entities or devices around the user and the environment in which the user and the user's device is located. Spatio-temporal context may define the user's location (e.g., physical or geographical location) in the real world at a certain point in time. Task context may describe information related to on-going tasks or applications being executed. Terminal context may be related to or descriptive of the status and/or capabilities of the user's device. Service context may relate to or be descriptive of services that are available at a particular location and access context may describe the status of network connectivity.

Delivery context may be used to describe a set of characteristics of a device, a network, user preferences and other aspects that may apply to an interaction between the device and an application (e.g., a web application). Aspects of delivery context could be either static or dynamic. Static aspects may include color resolution, display size, keyboard arrangement or other fixed properties of the device. Dynamic aspects may include properties of the device that may change over time such as current battery level, device orientation, device location, other applications running, and numerous other like characteristics.

Because of inherent relationships that context information may represent, context information may be represented as a tree structure. The tree structure may represent a hierarchical relationship between different context properties in which each property may form a node in the tree structure. DCCI is one example of such a tree structure, but it should be understood that embodiments of the present invention extend beyond this one example and may be extended to many other data structures that specify relationships between data objects and/or can be effectively distributed and shared.

Context may be determined, for example, based on a determination of various context parameters. DCCI uses context information to enable adaptation to permit interaction with various applications in consideration of device context. However, as indicated above, when devices are brought in proximity to each other in certain networks, such as smart spaces, context information may desirably be shared between such devices so that each device can receive some information about the context of the other device. As such, for example, a composite context tree may be provided that may be distributed to devices within the network. Embodiments of the present invention will be described below in connection with the use of context parameters defining the current context of devices to construct such a composite context tree.

FIG. 1 illustrates a schematic block diagram of a system for enabling context-triggered distribution of context models according to an exemplary embodiment of the present invention. As shown in FIG. 1, the system may include a composite tree builder 10 that may be in communication with one or more devices and may be configured to build a composite context tree based on the information provided to the composite tree builder 10 by entities associated with the respective devices. The composite tree builder 10 may be any means such as a device or circuitry embodied in hardware, software or a combination of hardware and software that is configured to receive context related information, and possibly also other information, from more than one device and generate a composite context tree based on the information received. The composite context tree may thereafter be shared with the devices providing information to the composite tree builder 10.

In an exemplary embodiment, the composite tree builder 10 may be resident on one or more of the devices providing information to the composite tree builder 10 or any other network device depending upon the network structure. Accordingly, for example, in a decentralized network in which multiple electronic devices are in communication with each other to form the network, the composite tree builder 10 may be resident on any one of the devices. Meanwhile, if the network is a centralized network, for example, the composite tree builder may be resident on any one of the devices or on a network server.

The composite tree builder 10 may be in communication with, for example, a context tree 12 associated with a first device (e.g., a fixed or mobile electronic communication device), a context tree profile 14 associated with the first device, and a security profile 16 associated with the first device. The composite tree builder 10 may also be in communication with, for example, a context tree 22 associated with a second device (e.g., a fixed or mobile electronic communication device), a context tree profile 24 associated with the second device, and a security profile 26 associated with the second device. The composite tree builder 10 may be configured to utilize the information received from the context tree 12 associated with a first device, the context tree 22 associated with the second device, the context tree profile 14 associated with the first device, the context tree profile 24 associated with the second device, the security profile 16 associated with the first device, and/or the security profile 26 associated with the second device to generate a first composite tree 18 for communication to the first device and a second composite tree 28 for communication to the second device.

The context tree 12 associated with the first device may include data indicative of the current context of the first device with respect to one or more of the context parameters described above or other context parameters. The context information in the context tree 12 associated with the first device may be communicated to an application or applications 30 that may be accessible via the network in which the first and second devices are operating. Similarly, the context tree 22 associated with the second device may include data indicative of the current context of the second device with respect to one or more of the context parameters described above or other context parameters. The context information in the context tree 22 associated with the second device may also be communicated to an application or applications 30 that may be accessible via the network in which the first and second devices are operating.

The security profile 16 associated with the first device may include data indicative of security and/or privacy information for the first device. Thus, the security profile 16 may define information that may be shared with other entities or devices and, in some cases, may define circumstances under which certain information may be shared. In some embodiments, the security profile itself may depend upon context information. As such, the security profile may be built dynamically based on the current context. Similarly, the security profile 26 associated with the second device may include data indicative of security or privacy information for the second device.

The context tree profile 14 associated with the first device may include information about the current context of the first device (e.g., from the context tree 12) and may include one or more profiles (e.g., context profiles) that may be suited to various different contexts. As such, for example, in response to receipt of indications of the current context from the context tree 12, the context tree profile 14 may provide information of the context profile associated with the respective current context to the composite tree builder 10. Similarly, the context tree profile 24 associated with the second device may include information about the current context of the second device (e.g., from the context tree 22) and may include one or more profiles suited to various different contexts as described above. Thus, in response to receipt of indications of the current context from the context tree 22, the context tree profile 24 may also provide information of the context profile associated with the respective current context to the composite tree builder 10. The composite tree builder 10 may then use the context tree profile 14 associated with the first device and the context tree profile 24 associated with the second device in the generation of the first composite tree 18 and the second composite tree 28 as described above.

In an exemplary embodiment, the context tree profile 14 associated with the first device and the context tree profile 24 associated with the second device (e.g., context profiles) may each be constructed based on context information associated with the respective device and may include static and/or dynamic profiles. If the current context is related to a static profile, the static profile may be directly communicated to the composite tree builder 10 when the current context initially changes to correspond to the static profile. If the profile is instead a dynamic profile, according to an exemplary embodiment, the profile may be constructed via scripts written that look at context data change and build a profile suited to the current context.

The first composite tree 18 and the second composite tree 28 (and additional other composite trees if other devices are included) may then be constructed by the composite tree builder 10 on the basis of the current context of each respective device and the profile indicated for use in connection with the current context of each respective device. The composite tree builder 10 may further select and/or apply an appropriate security profile applicable to the current context as well. In some cases, the context profile may indicate which one of multiple available security profiles is to be employed for the current context. Thus, the context tree profiles may provide a mechanism by which the composite tree builder 10 may generate composite trees. The composite trees may be generated and distributed to devices in the network that account for changes in context of the devices in consideration of a context profile and/or a security profile.

In an exemplary embodiment, the composite tree builder 10 may parse a context tree profile (e.g., context tree profile 14 and/or context tree profile 24) while also consulting a security profile (e.g., security profile 16 and/or security profile 26). Based on the context tree profile and/or the security profile, appropriate data from the context tree (e.g., context tree 12 and/or context tree 22) may be solicited or otherwise accessed by the composite tree builder 10 for building a composite tree. Then, the composite tree builder 10 may construct a composite tree for each device based on a combination of data from each device and distribute a composite tree to each respective device. Accordingly, the composite tree builder 10 may be enabled to construct a composite tree for each device based at least in part on context information associated with each respective device and also account for changes in context by updating the context tree in response to changes in the context information. Given that the respective context and security profiles of each device are used to select appropriate data (e.g., data that is permitted to be shared based on the profiles) for use in constructing the composite trees, context based triggering may be utilized to provide dynamic distribution of composite context related information. Thus, in the exemplary embodiment of FIG. 1, the context tree profiles may be utilized to inform the composite tree builder 10 of which data from the context trees, the composite tree builder 10 should use for composite tree generation.

Figure 2:
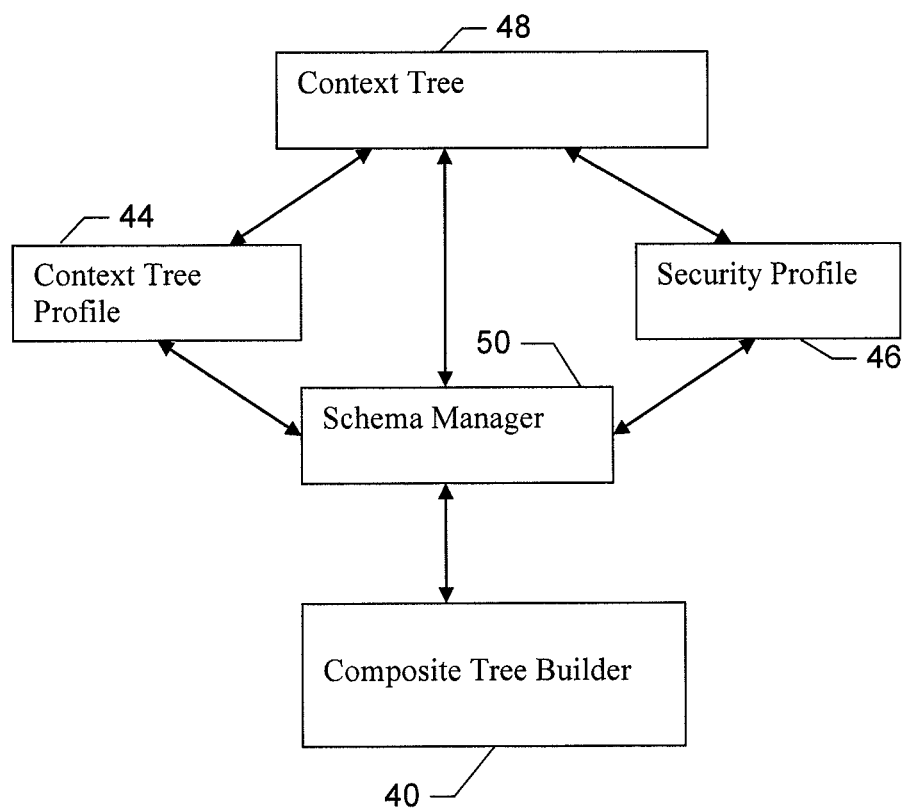
FIG. 2 illustrates a schematic block diagram of an alternative system for enabling context-triggered distribution of context models according to an exemplary embodiment of the present invention.

Other alternatives to the operations described in connection with FIG. 1 are also possible without departing from the scope of embodiments of the present invention. In this regard, for example, an alternative mechanism for performing composite tree generation may include a schema based approach. FIG. 2 illustrates a schematic block diagram of an alternative system for enabling context-triggered distribution of context models according to an exemplary embodiment of the present invention. In the exemplary embodiment of FIG. 2, instead of providing a profile to a composite tree builder directly for informing the composite tree builder of what data can be accessed (e.g., from the context trees), the tree profile may be used to act as a schema that shows, provides or otherwise enables access to only that data which the composite tree builder may use for composite tree building. Thus, for example, one exemplary embodiment (e.g., the exemplary embodiment of FIG. 1) may provide the composite tree builder with access to all context information, but inform the composite tree builder of which of the context information to use, while an alternative exemplary embodiment (e.g., the exemplary embodiment of FIG. 2) may provide the composite tree builder with access only to the context information that may be used.

As shown in FIG. 2, in order to implement a schema based approach, the structure of the exemplary embodiment of FIG. 1 may be modified. In this regard, a composite tree builder 40 having properties similar to those of the composite tree builder 10 described in reference to FIG. 1 may be utilized to employ information from a context tree profile 44, a security profile 46, and a context tree 48 (or profiles and context trees from multiple devices) to generate a composite tree. However, a schema manager 50 may actually communicate selected information from the context tree profile 44, the security profile 46, and the context tree 48 to the composite tree builder 40.

The schema manager 50 may be any means such as a device or circuitry embodied in hardware, software or a combination of hardware and software configured to combine multiple schemas and apply the combined schema to the context tree 48. Accordingly, all access to the context tree 48 may take place via the schema manager 50. In other words, the composite tree builder 40 "sees" data in the context tree 48 through the schema manager 50.

The schema manager 50 may receive information from both the context tree profile 44 and the security profile 46 to determine what "view" the composite tree builder 40 is provided with respect to the context tree 48. In an exemplary embodiment, the composite tree builder 40 may query the schema manager 50 for information in the tree. The schema manager 50 may provide a pointer or other indicator to a root node of a schema-applied tree structure. Thus, when the composite tree builder 40 queries the schema manager for information in the context tree 48, the schema manager 50 may query both the security profile 46 and the context tree profile 44 for their respective current profiles based on the current context.

Figure 3:
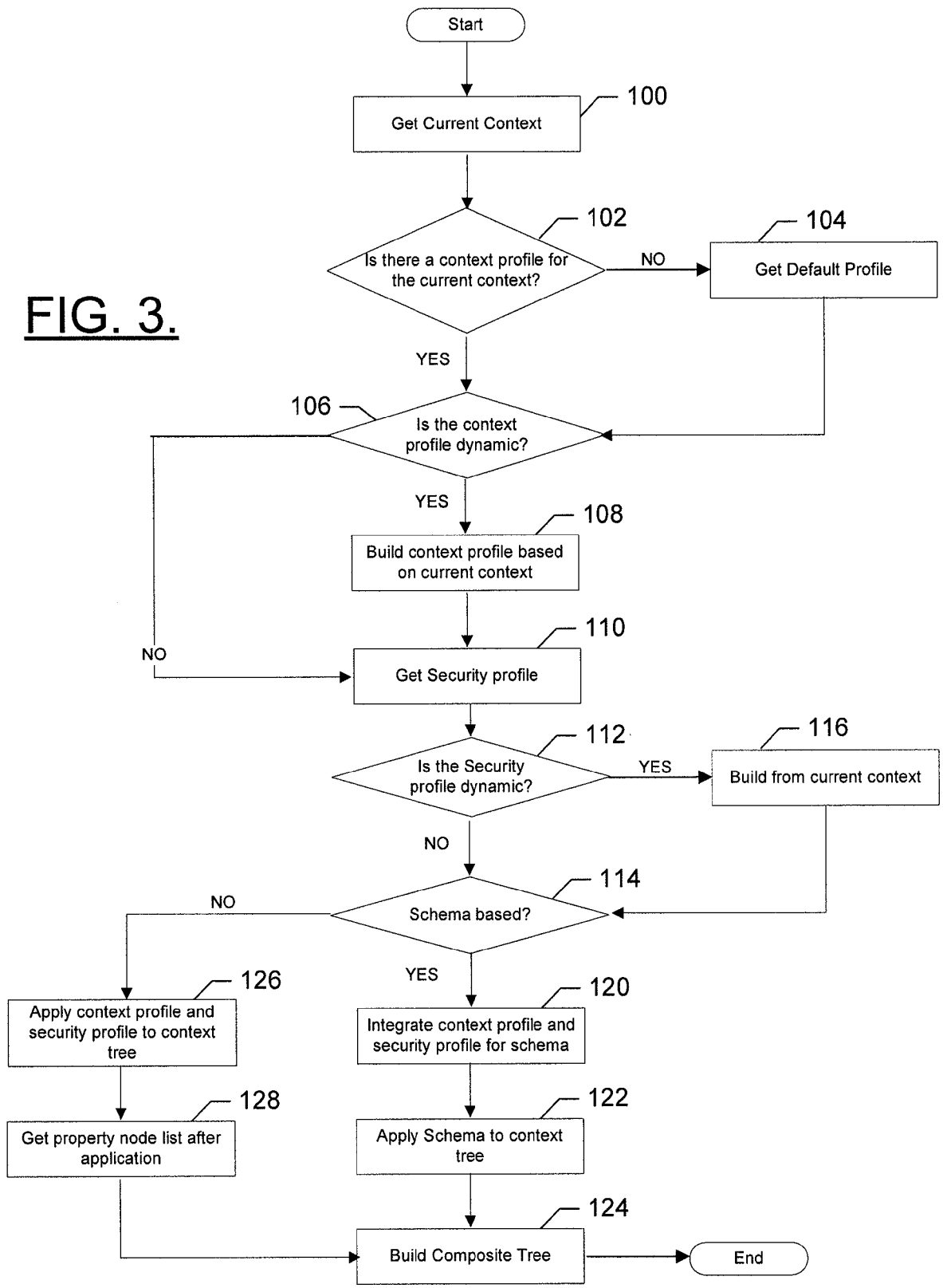
FIG. 3 is a flowchart illustrating deployment of an exemplary embodiment of the present invention.

An example of a flowchart illustrating deployment of an exemplary embodiment of the present invention is shown in FIG. 3. It should be understood that FIG. 3 illustrates deployment of an embodiment in consideration of a single device's context and security profiles. However, embodiments of the present invention may perform the operations described in connection with FIG. 3 for several different devices. As shown in FIG. 3, a current context for a device may initially be obtained at operation 100. A determination may then be made at operation 102 with respect to whether there is a context profile for the current context. If there is no context profile for the current context, a default profile may be obtained at operation 104. However, if there is a context profile for the current context, a further determination may be made as to whether or not the context profile is static or dynamic at operation 106. If the context profile is not dynamic (i.e., the profile is static), then the security profile may be retrieved at operation 110 and the static profile can be provided ultimately to the composite tree builder. If, on the other hand, the context profile is dynamic, then a context profile may be built based on the current context at operation 108 prior to retrieving the security profile at operation 110, and the built profile may be provided ultimately to the composite tree builder. When the security profile is retrieved, a determination may be made as to whether the security profile is static or dynamic at operation 112. If the security profile is not dynamic (i.e., the profile is static), then a schema based or composite build determination may be made at operation 114. In practice, no determination may be necessary at operation 114, since the architecture may clearly include a schema manager or not, and thus the respective operations that follow may depend on which architecture is employed. If the security profile is dynamic, then the security profile may be built based on the current context at operation 116 prior to being utilized for tree building.

If a schema based embodiment is employed, an integration of the context profile and the security profile for schema determination may be performed at operation 120. The schema determined may then be applied to the context tree at operation 122 to provide the composite tree builder with a corresponding view of the context tree for composite tree building at operation 124. Alternatively, if the schema based embodiment is not employed, then a composite build may be accomplished by first applying the context profile and the security profile to the context tree at operation 126. A property node list may then be generated at operation 128 to provide the composite tree builder with information for use in composite tree building at operation 124.

Figure 4:
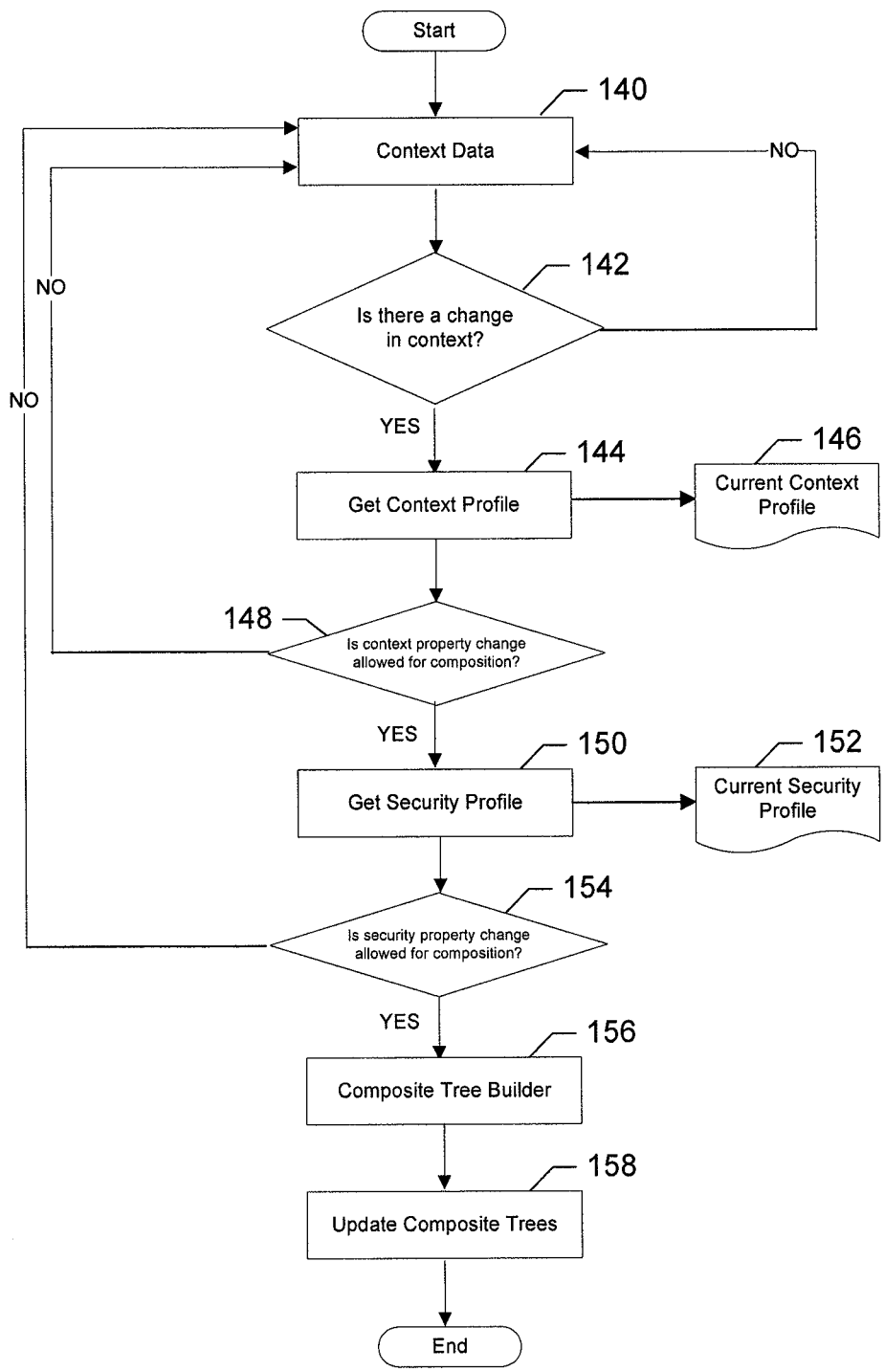
FIG. 4 is a flowchart illustrating execution of an exemplary embodiment of the present invention.

FIG. 4 is a flowchart illustrating execution of an exemplary embodiment of the present invention. As shown in FIG. 4, context data may be received at operation 140. Based on the context data received, a determination may be made at operation 142 with respect to whether the received context data represents a change in context. If no change is determined, additional context data received will be similarly analyzed. If the context data received is indicative of a change in context, a current context profile 146 may be retrieved at operation 144. A determination may then be made at operation 148 with respect to whether a context property change is allowed for composition (e.g., based on the context profile and the current context). If a change is not allowed, then additional context data received may again be analyzed as described above. If a change is allowed, then a current security profile 152 may be retrieved at operation 150. Another determination may be made at operation 154 with respect to whether a security property change is allowed for composition (e.g., based on the security profile and the current context). If a change is not allowed, then additional context data received may again be analyzed as described above. If a change is allowed, then the composite tree builder may receive information relating to the context data and/or the security profile and context profile at operation 156. The composite tree builder may then update composite trees for one or more devices based on the received information at operation 158.

An exemplary embodiment of the invention will now be described with reference to FIG. 5, in which certain elements of an apparatus for enabling the provision of context triggered distribution of context models are displayed. The apparatus of FIG. 5 may be employed, for example, on a mobile terminal (e.g., the mobile terminal 210 of FIG. 6) or a variety of other devices, both mobile and fixed (such as, for example, a network device, server, proxy, or the like). Alternatively, embodiments may be employed on a combination of devices. Accordingly, some embodiments of the present invention may be embodied wholly at a single device (e.g., the mobile terminal 210) or by devices in a client/server relationship. Furthermore, it should be noted that the devices or elements described below may not be mandatory and thus some may be omitted in certain embodiments.

Figure 5:
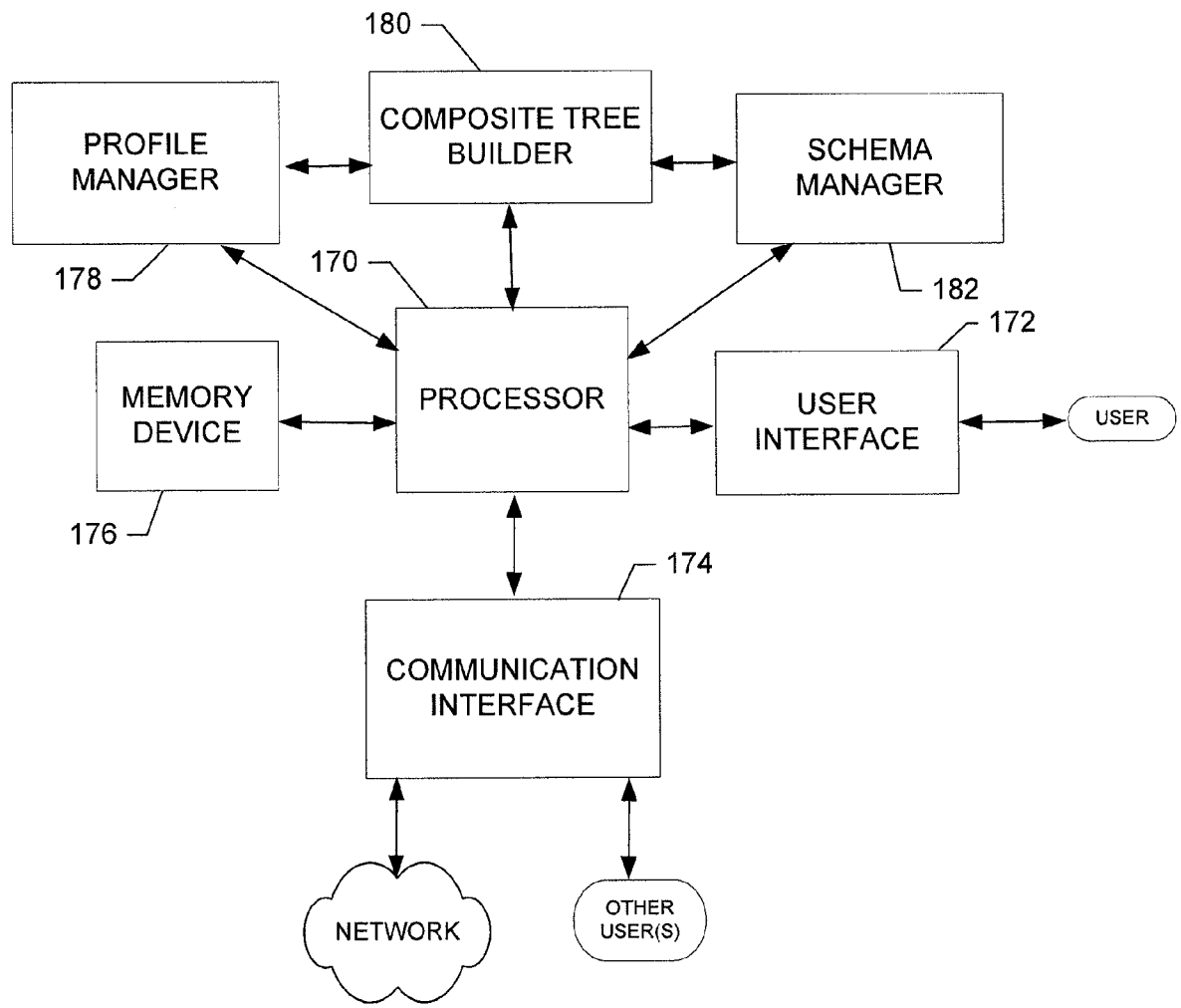
FIG. 5 is a schematic block diagram of an apparatus for enabling context-triggered distribution of context models according to an exemplary embodiment of the present invention.

Referring now to FIG. 5, an apparatus for enabling the provision of context-triggered distribution of context models is provided. The apparatus may include or otherwise be in communication with a processor 170, a user interface 172, a communication interface 174 and a memory device 176. The memory device 176 may include, for example, volatile and/or non-volatile memory. The memory device 176 may be configured to store information, data, applications, instructions or the like for enabling the apparatus to carry out various functions in accordance with exemplary embodiments of the present invention. For example, the memory device 176 could be configured to buffer input data for processing by the processor 170. Additionally or alternatively, the memory device 176 could be configured to store instructions for execution by the processor 170. As yet another alternative, the memory device 176 may be one of a plurality of databases that store information and/or media content.

The processor 170 may be embodied in a number of different ways. For example, the processor 170 may be embodied as various processing means such as a processing element, a coprocessor, a controller or various other processing devices including integrated circuits such as, for example, an ASIC (application specific integrated circuit), an FPGA (field programmable gate array), a hardware accelerator, or the like. In an exemplary embodiment, the processor 170 may be configured to execute instructions stored in the memory device 176 or otherwise accessible to the processor 170.

Meanwhile, the communication interface 174 may be any means such as a device or circuitry embodied in either hardware, software, or a combination of hardware and software that is configured to receive and/or transmit data from/to a network and/or any other device or module in communication with the apparatus. In this regard, the communication interface 174 may include, for example, an antenna (or multiple antennas) and supporting hardware and/or software for enabling communications with a wireless communication network. In fixed environments, the communication interface 174 may alternatively or also support wired communication. As such, the communication interface 174 may include a communication modem and/or other hardware/software for supporting communication via cable, digital subscriber line (DSL), universal serial bus (USB) or other mechanisms.

The user interface 172 may be in communication with the processor 70 to receive an indication of a user input at the user interface 172 and/or to provide an audible, visual, mechanical or other output to the user. As such, the user interface 172 may include, for example, a keyboard, a mouse, a joystick, a touch screen display, a display, a microphone, a speaker, or other input/output mechanisms. In an exemplary embodiment in which the apparatus is embodied as a server or some other network devices, the user interface 172 may be limited, or eliminated. However, in an embodiment in which the apparatus is embodied as a mobile terminal (e.g., the mobile terminal 210), the user interface 172 may include, among other devices or elements, any or all of a speaker, a microphone, a display, and a keyboard or the like.

In an exemplary embodiment, the processor 170 may be embodied as, include or otherwise control a profile manager 178, a composite tree builder 180 and a schema manager 182. The profile manager 178, the composite tree builder 180 and the schema manager 182 may each be any means such as a device or circuitry embodied in hardware, software or a combination of hardware and software that is configured to perform the corresponding functions of the profile manager 178, the composite tree builder 180 and the schema manager 182, respectively, as described below.

The profile manager 178 may be configured to receive context data and communicate with the schema manager 182 (if the schema manager 182 is used), the security profile and/or context tree profile to determine what access or information is provided to the composite tree builder 180 with respect to the context tree. Thus, for example, with respect to FIG. 3, the profile manager 178 may be responsible for operations 100-116, 126 and 128. In embodiments where the schema manager 182 is employed, the schema manager 182 may be configured, as described above, to receive information from both the context tree profile and the security profile to determine what "view" the composite tree builder is provided with respect to the context tree. Thus, for example, with respect to FIG. 3, the schema manager 182 may be responsible for operations 120 and 122. The composite tree builder 180, may be configured to construct a composite tree (e.g., as shown in operation 124) for each device based at least in part on context information associated with each respective device and also account for changes in context by updating the context tree in response to changes in the context information, as described in greater detail above in relation to descriptions of the composite tree builder 10 or composite tree builder 40.

Figure 6:
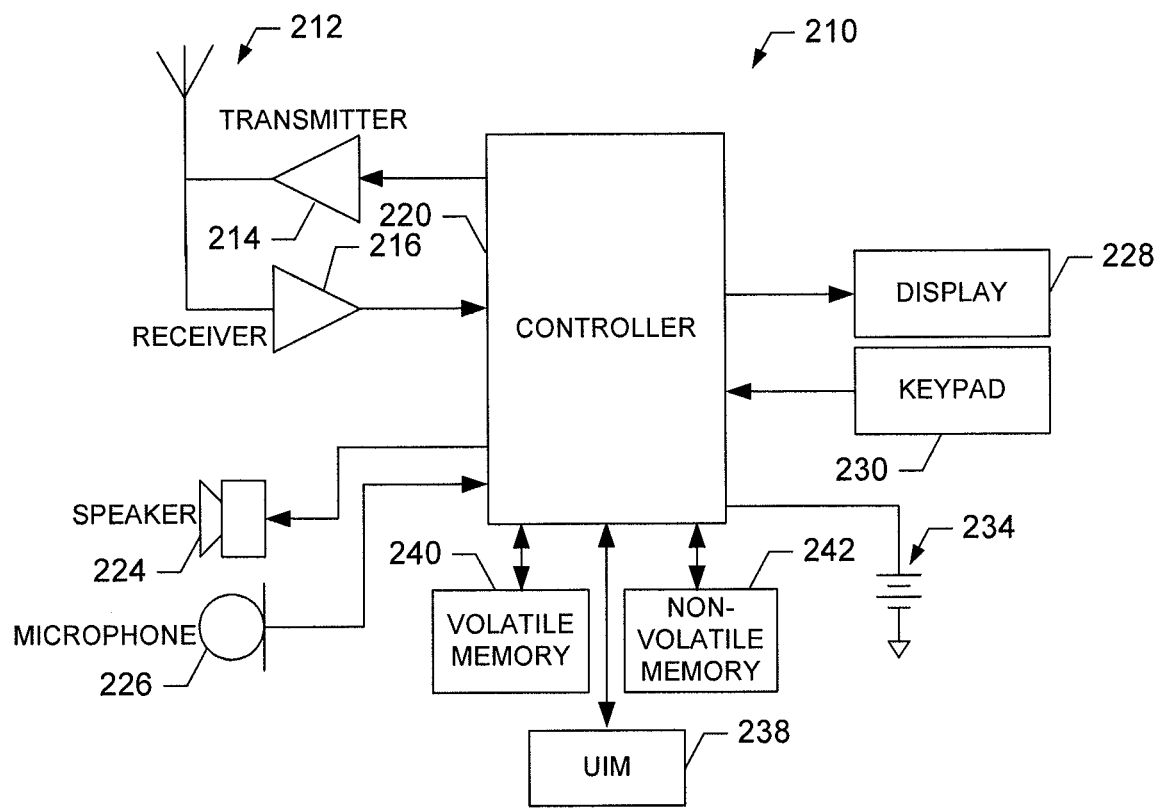
FIG. 6 is a schematic block diagram of a mobile terminal according to an exemplary embodiment of the present invention.

FIG. 6 illustrates a block diagram of a mobile terminal 210 that may benefit from embodiments of the present invention. It should be understood, however, that a mobile terminal as illustrated and hereinafter described is merely illustrative of one type of mobile terminal that may benefit from some embodiments of the present invention and, therefore, should not be taken to limit the scope of embodiments of the present invention. Several types of mobile terminals, such as portable digital assistants (PDAs), pagers, mobile televisions, gaming devices, all types of computers (e.g., laptops or mobile computers), cameras, audio/video players, radio, global positioning system (GPS) devices, or any combination of the aforementioned, and other types of communications systems, can readily employ embodiments of the present invention.

In addition, while several embodiments of the method of the present invention may be performed or used by or in connection with a mobile terminal 210, the method may be employed by or used in connection with devices other than a mobile terminal (e.g., personal computers (PCs), servers, or the like). Moreover, the system and method of embodiments of the present invention may have been primarily described in conjunction with mobile communications applications. It should be understood, however, that the system and method of embodiments of the present invention can be utilized in conjunction with a variety of other applications, both in the mobile communications industries and outside of the mobile communications industries.

The mobile terminal 210 may include an antenna 212 (or multiple antennas) in operable communication with a transmitter 214 and a receiver 216. The mobile terminal 210 may further include an apparatus, such as a controller 220 or other processing element, that provides signals to and receives signals from the transmitter 214 and receiver 216, respectively. The signals may include signaling information in accordance with the air interface standard of the applicable cellular system, and/or may also include data corresponding to speech, received data and/or user generated/transmitted data. In this regard, the mobile terminal 210 may be capable of operating with one or more air interface standards, communication protocols, modulation types, and access types. By way of illustration, the mobile terminal 210 may be capable of operating in accordance with any of a number of first, second, third and/or fourth-generation communication protocols or the like. For example, the mobile terminal 210 may be capable of operating in accordance with second-generation (2G) wireless communication protocols IS-136 (time division multiple access (TDMA)), GSM (global system for mobile communication), and IS-95 (code division multiple access (CDMA)), or with third-generation (3G) wireless communication protocols, such as Universal Mobile Telecommunications System (UMTS), CDMA2000, wideband CDMA (WCDMA) and time division-synchronous CDMA (TD-SCDMA), with 3.9G wireless communication protocol such as E-UTRAN (evolved-universal terrestrial radio access network), with fourth-generation (4G) wireless communication protocols or the like. As an alternative (or additionally), the mobile terminal 210 may be capable of operating in accordance with non-cellular communication mechanisms. For example, the mobile terminal 210 may be capable of communication in a wireless local area network (WLAN) or other communication networks.

It is understood that the apparatus, such as the controller 220, may include circuitry for implementing, among others, audio/video and logic functions of the mobile terminal 210. For example, the controller 220 may comprise a digital signal processor device, a microprocessor device, and various analog to digital converters, digital to analog converters, and/or other support circuits. Control and signal processing functions of the mobile terminal 210 are allocated between these devices according to their respective capabilities. The controller 220 thus may also include the functionality to encode and interleave message and data prior to modulation and transmission. The controller 220 may additionally include an internal voice coder, and may include an internal data modem. Further, the controller 220 may include functionality to operate one or more software programs, which may be stored in memory. For example, the controller 220 may be capable of operating a connectivity program, such as a conventional web browser. The connectivity program may then allow the mobile terminal 210 to transmit and receive web content, such as location-based content and/or other web page content, according to a Wireless Application Protocol (WAP), Hypertext Transfer Protocol (HTTP) and/or the like, for example.

The mobile terminal 210 may also comprise a user interface including an output device such as an earphone or speaker 224, a microphone 226, a display 228, and a user input interface, which may be operationally coupled to the controller 220. The user input interface, which allows the mobile terminal 210 to receive data, may include any of a number of devices allowing the mobile terminal 210 to receive data, such as a keypad 230, a touch display (not shown) or other input device. In embodiments including the keypad 230, the keypad 230 may include numeric (0-9) and related keys (#, *), and other hard and soft keys used for operating the mobile terminal 210. Alternatively, the keypad 230 may include a QWERTY keypad arrangement. The keypad 230 may also include various soft keys with associated functions. In addition, or alternatively, the mobile terminal 210 may include an interface device such as a joystick or other user input interface. The mobile terminal 210 further includes a battery 234, such as a vibrating battery pack, for powering various circuits that are used to operate the mobile terminal 210, as well as optionally providing mechanical vibration as a detectable output.

The mobile terminal 210 may further include a user identity module (UIM) 238. The UIM 238 is typically a memory device having a processor built in. The UIM 238 may include, for example, a subscriber identity module (SIM), a universal integrated circuit card (UICC), a universal subscriber identity module (USIM), a removable user identity module (R-UIM), etc. The UIM 238 typically stores information elements related to a mobile subscriber. In addition to the UIM 238, the mobile terminal 210 may be equipped with memory. For example, the mobile terminal 210 may include volatile memory 240, such as volatile Random Access Memory (RAM) including a cache area for the temporary storage of data. The mobile terminal 210 may also include other non-volatile memory 242, which may be embedded and/or may be removable. The non-volatile memory 242 can additionally or alternatively comprise an electrically erasable programmable read only memory (EEPROM), flash memory, other non-volatile RAM (NVRAM) or the like. Non-volatile memory 240 may also include a cache area for the temporary storage of data. The memories can store any of a number of pieces of information, and data, used by the mobile terminal 210 to implement the functions of the mobile terminal 210. For example, the memories can include an identifier, such as an international mobile equipment identification (IMEI) code, capable of uniquely identifying the mobile terminal 210. Furthermore, the memories may store instructions for determining cell id information. Specifically, the memories may store an application program for execution by the controller 220, which determines an identity of the current cell, i.e., cell id identity or cell id information, with which the mobile terminal 210 is in communication.

Figure 7:
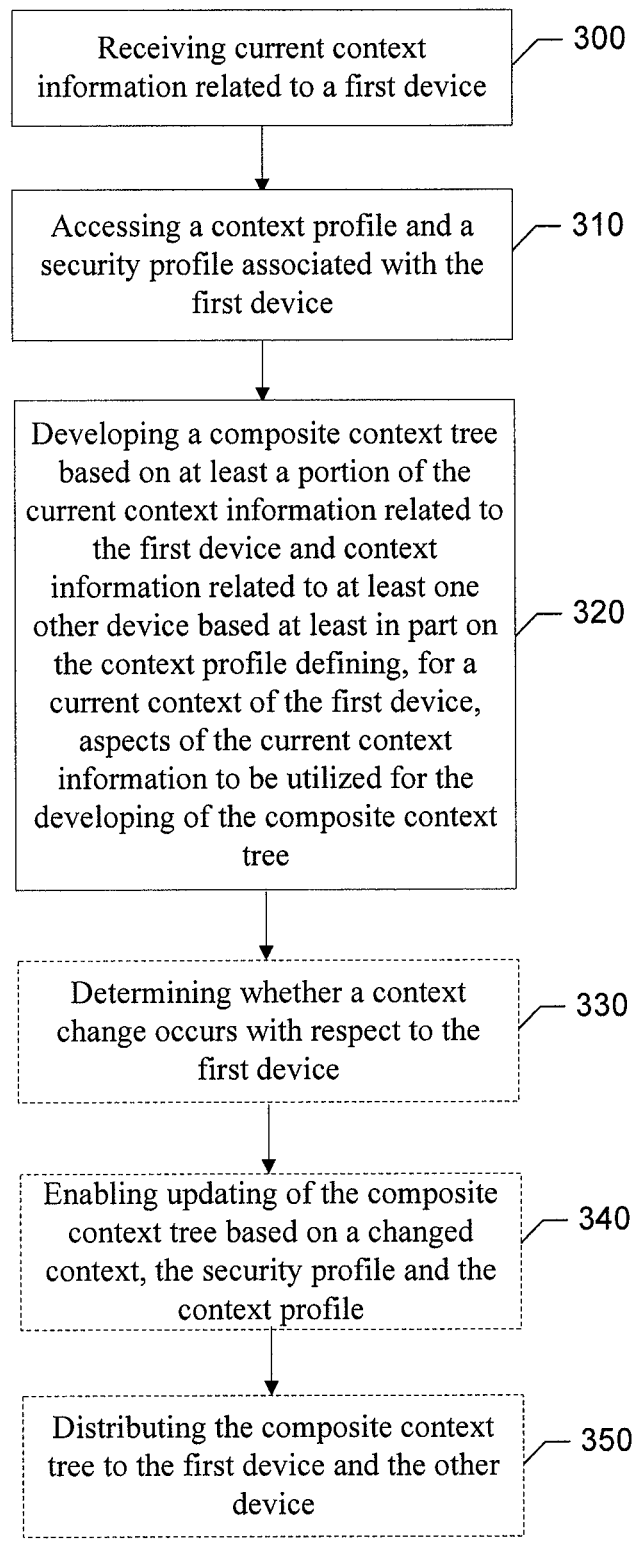
FIG. 7 is a flowchart according to an exemplary method for providing context-triggered distribution of context models according to an exemplary embodiment of the present invention.

FIG. 7 is a flowchart of a system, method and program product according to some exemplary embodiments of the invention. It will be understood that each block or step of the flowchart, and combinations of blocks in the flowchart, can be implemented by various means, such as hardware, firmware, and/or software including one or more computer program instructions. For example, one or more of the procedures described above may be embodied by computer program instructions. In this regard, the computer program instructions which embody the procedures described above may be stored by a memory device of a mobile terminal or other apparatus employing embodiments of the present invention and executed by a processor in the mobile terminal or other apparatus. As will be appreciated, any such computer program instructions may be loaded onto a computer or other programmable apparatus (i.e., hardware) to produce a machine, such that the instructions which execute on the computer (e.g., via a processor) or other programmable apparatus create means for implementing the functions specified in the flowchart block(s) or step(s). These computer program instructions may also be stored in a computer-readable memory that can direct a computer (e.g., the processor or another computing device) or other programmable apparatus to function in a particular manner, such that the instructions stored in the computer-readable memory produce an article of manufacture including instruction means which implement the function specified in the flowchart block(s) or step(s). The computer program instructions may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions specified in the flowchart block(s) or step(s).

Accordingly, blocks or steps of the flowchart support combinations of means for performing the specified functions, combinations of steps for performing the specified functions and program instruction means for performing the specified functions. It will also be understood that one or more blocks or steps of the flowchart, and combinations of blocks or steps in the flowchart, can be implemented by special purpose hardware-based computer systems which perform the specified functions or steps, or combinations of special purpose hardware and computer instructions.

In this regard, one embodiment of a method for providing context triggered distribution of context models as illustrated, for example, in FIG. 7 may include receiving current context information related to a first device at operation 300 and accessing a context profile and a security profile associated with the first device at operation 310. In an exemplary embodiment, the method may further include developing a composite context tree based on at least a portion of the current context information related to the first device and context information related to at least one other device based at least in part on the context profile defining, for a current context of the first device, aspects of the current context information to be utilized for the developing of the composite context tree at operation 320.

In an exemplary embodiment, the method may include further optional operations as well, some examples of which are shown in FIG. 7 in dashed lines. In this regard, exemplary additional operations may include operation 330 of determining whether a context change occurs with respect to the first device and operation 340 of enabling updating of the composite context tree based on a changed context, the security profile and the context profile. In another exemplary embodiment, the method may include operation 350 of distributing the composite context tree to the first device and the other device.

In an exemplary embodiment, operation 310 may include determining whether the context or security profile is a dynamic profile and, if the either profile is a dynamic profile, building an updated context or security profile based on the current context information. In another exemplary embodiment, operation 310 may include determining whether a profile exists for either of the context profile or the security profile for the current context information.

In an exemplary embodiment, operation 320 may include developing the composite context tree by generating a schema based on the security profile and the context profile in which the schema defines the portion of the current context information. In such a situation, the schema may be applied to a context tree including the current context information such that only a portion of the context tree defined by the schema is visible to an entity developing the composite context tree. As an alternative, operation 320 may include applying the security profile and the context profile to a context tree including the current context information to define a node list providing the portion of the current context information to be used for composite context tree development.

In an exemplary embodiment, an apparatus for performing the method of FIG. 7 above may comprise a processor (e.g., the processor 170) configured to perform some or each of the operations (300-350) described above. The processor may, for example, be configured to perform the operations (300-350) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 300 to 350 may comprise, for example, the processor 170, respective ones of the profile manager 178, the composite tree builder 180, and the schema manager 182, or an algorithm executed by the processor for controlling the use of context tree information for composite tree generation as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method comprising:

receiving current context information related to a first device;

accessing a context profile and a security profile associated with the first device;

developing a composite context tree based on at least a portion of the current context information related to the first device and context information related to at least one other device based at least in part on the context profile defining, for a current context of the first device, aspects of the current context information to be utilized for the developing of the composite context tree, wherein developing the composite context tree comprises generating a schema based on the security profile and the context profile in which the schema defines the portion of the current context information and applying the schema to a context tree including the current context information such that only a portion of the context tree defined by the schema is visible to an entity developing the composite context tree;

determining a context change has occurred with respect to the first device;

determining whether the context change to the composite context tree is allowed based on the security profile and the context profile;

wherein in an instance in which the context change is determined to be allowed, the context tree is updated for the context change; and wherein in an instance in which the context change is determined to not be allowed, the context tree is not updated for the context change.

2. The method of claim 1, wherein developing the composite context tree comprises applying the security profile and the context profile to a context tree including the current context information to define a node list providing the portion of the current context information to be used for composite context tree development.

3. The method of claim 1, further comprising distributing the composite context tree to the first device and the other device.

4. The method of claim 1, wherein accessing the context profile comprises determining whether the context profile is a dynamic profile and, if the context profile is a dynamic profile, building an updated context profile based on the current context information.

5. The method of claim 1, wherein accessing the security profile comprises determining whether the security profile is a dynamic profile and, if the security profile is a dynamic profile, building an updated security profile based on the current context information.

6. The method of claim 1, wherein accessing the context profile and the security profile comprises determining whether a profile exists for either of the context profile or the security profile for the current context information.

7. An apparatus comprising a processor and a memory storing computer program code, wherein the memory and stored computer program code are configured, with the processor, to cause the apparatus to at least:

receive current context information related to a first device;

access a context profile and a security profile associated with the first device; and develop a composite context tree based on at least a portion of the current context information related to the first device and context information related to at least one other device based at least in part on the context profile defining, for a current context of the first device, aspects of the current context information to be utilized for the developing of the composite context tree, wherein the apparatus being caused to develop the composite context tree comprises generating a schema based on the security profile and the context profile in which the schema defines the portion of the current context information and applying the schema to a context tree including the current context information such that only a portion of the context tree defined by the schema is visible to an entity developing the composite context tree;

determine a context change has occurred with respect to the first device;

determine whether the context change to the composite context tree is allowed based on the security profile and the context profile;

wherein in an instance in which the context change is determined to be allowed, the context tree is updated for the context change; and wherein in an instance in which the context change is determined to not be allowed, the context tree is not updated for the context change.

8. The apparatus of claim 7, wherein developing the composite context tree comprises applying the security profile and the context profile to a context tree including the current context information to define a node list providing the portion of the current context information to be used for composite context tree development.

9. The apparatus of claim 7, wherein the processor is further configured to distribute the composite context tree to the first device and the other device.

10. The apparatus of claim 7, wherein the processor is configured to access the context profile by determining whether the context profile is a dynamic profile and, if the context profile is a dynamic profile, building an updated context profile based on the current context information.

11. The apparatus of claim 7, wherein the processor is configured to access the security profile by determining whether the security profile is a dynamic profile and, if the security profile is a dynamic profile, building an updated security profile based on the current context information.

12. The apparatus of claim 7, wherein the processor is configured to access the context profile and the security profile by determining whether a profile exists for either of the context profile or the security profile for the current context information.

13. A computer program product comprising at least one non-transitory computer-readable storage medium having computer-executable program code portions stored therein, the computer-executable program code portions comprising:

a first program code portion for receiving current context information related to a first device;

a second program code portion for accessing a context profile and a security profile associated with the first device;

a third program code portion for developing a composite context tree based on at least a portion of the current context information related to the first device and context information related to at least one other device based at least in part on the context profile defining, for a current context of the first device, aspects of the current context information to be utilized for the developing of the composite context tree, wherein the third program code portion includes instructions for generating a schema based on the security profile and the context profile in which the schema defines the portion of the current context information and for applying the schema to a context tree including the current context information such that only a portion of the context tree defined by the schema is visible to an entity developing the composite context tree;

a fourth program code portion for determining a context change has occurred with respect to the first device;

a fifth program code portion for determining whether the context change to the composite context tree is allowed based on the security profile and the context profile;

wherein in an instance in which the context change is determined to be allowed, the context tree is updated for the context change; and wherein in an instance in which the context change is determined to not be allowed, the context tree is not updated for the context change.

14. The computer program product of claim 13, wherein the third program code portion includes instructions for applying the security profile and the context profile to a context tree including the current context information to define a node list providing the portion of the current context information to be used for composite context tree development.

15. The computer program product of claim 13, further comprising a sixth program code portion for distributing the composite context tree to the first device and the other device.

16. The computer program product of claim 13, wherein the second program code portion includes instructions for determining whether the context profile is a dynamic profile and, if the context profile is a dynamic profile, building an updated context profile based on the current context information.

17. The computer program product of claim 13, wherein the second program code portion includes instructions for determining whether the security profile is a dynamic profile and, if the security profile is a dynamic profile, building an updated security profile based on the current context information.

18. The computer program product of claim 13, wherein the second program code portion includes instructions for determining whether a profile exists for either of the context profile or the security profile for the current context information.

19. An apparatus comprising:

means for receiving current context information related to a first device;

means for accessing a context profile and a security profile associated with the first device;

means for developing a composite context tree based on at least a portion of the current context information related to the first device and context information related to at least one other device based at least in part on the context profile defining, for a current context of the first device, aspects of the current context information to be utilized for the developing of the composite context tree, wherein the means for developing the composite context tree comprise means for generating a schema based on the security profile and the context profile in which the schema defines the portion of the current context information and means for applying the schema to a context tree including the current context information such that only a portion of the context tree defined by the schema is visible to an entity developing the composite context tree means for determining a context change has occurred with respect to the first device;

means for determining whether the context change to the composite context tree is allowed based on the security profile and the context profile;

wherein in an instance in which the context change is determined to be allowed, the context tree is updated for the context change; and wherein in an instance in which the context change is determined to not be allowed, the context tree is not updated for the context change.

* * * * *